Aug. 13, 1968  J. K. GODSEY  3,396,572
ANGLE ATTACHMENT FOR RIVET GUN
Filed July 21, 1966
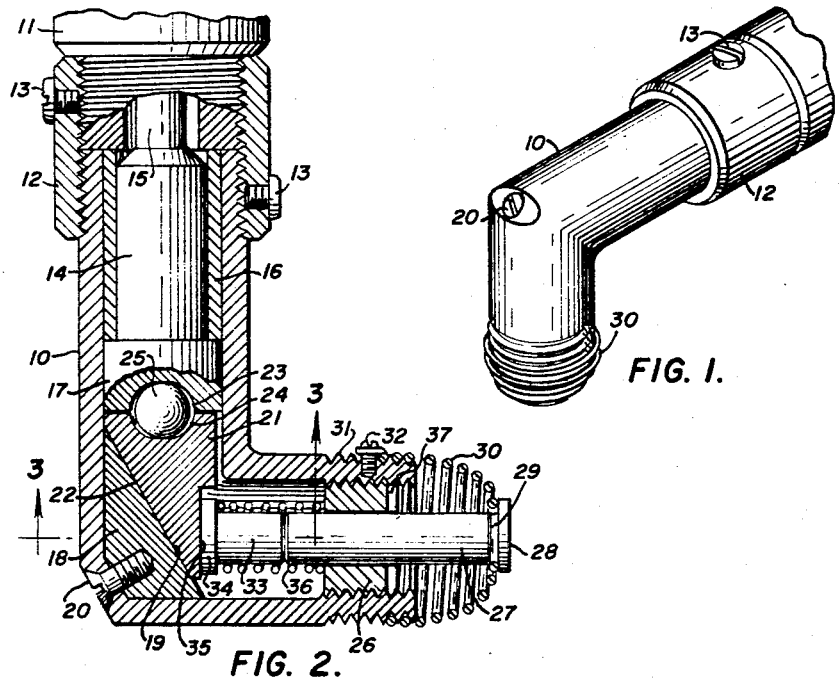
FIG. 1.
FIG. 2.
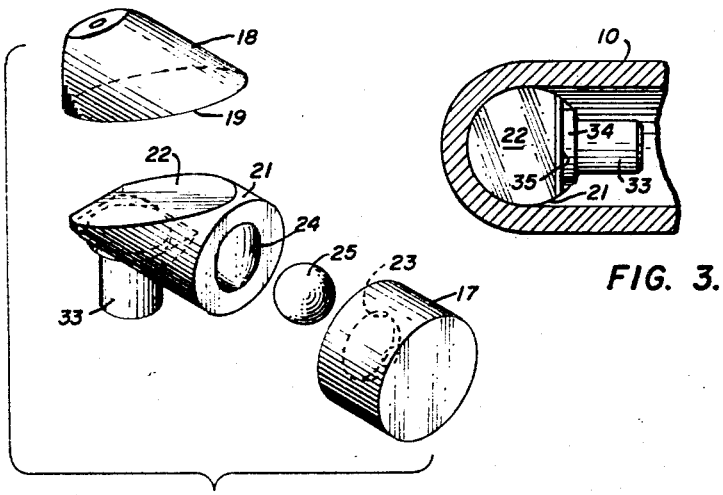
FIG. 3.
FIG. 4.
JAMES K. GODSEY
INVENTOR.
BY *Herbert J. Brown*
ATTORNEY United States Patent Office 3,396,572
Patented Aug. 13, 1968

3,396,572
ANGLE ATTACHMENT FOR RIVET GUN
James K. Godsey, 3844 Dismont, Dallas, Tex. 75211
Filed July 21, 1966, Ser. No. 566,926
3 Claims. (Cl. 72—452)

This invention relates to rivet guns and has reference to an angle attachment therefor.

Rivet guns, sometimes referred to as riveting hammers, are either fluid operated or mechanically operated, but in all cases have a reciprocating rivet set which shapes the end of a rivet projecting from a part or parts of a construction during assembly. Heretofore rivet guns had angle attachments for reaching otherwise inaccessible places for carrying out the riveting operation. In order to transmit reciprocating motion at an angle these prior attachments had pivotally mounted generally triangular elements against which angularly disposed plungers made contact. Of necessity, the pivot points of such elements were outside the lines of motion of the plungers with the result that enlargements were provided in the angle defined by the plungers to support pivot pins or the like. Obviously, such enlargements prevented the use of rivet guns in some closely confined work.

The primary object of the invention is to provide an angle attachment for rivet guns which eliminates enlargements for mounting pivoted elements and whereby rivet guns according to the invention may be used in heretofore inaccessible places.

Another object is to provide an angle attachment of sturdy construction which is easily assembled or diassembled for cleaning or repairs.

These and other objects of the invention will become apparent from the following description and the accompanying drawing, in which:

FIGURE 1 is a perspective view of an angle attachment according to the invention and is shown attached to a broken portion of an operating cylinder.

FIGURE 2 is a longitudinal section and broken elevation of the attachment illustrated in FIGURE 1.

FIGURE 3 is an exploded perspective view of the deflector, wedge, first lateral plunger element, ball and anvil. It is to be noted in this view that the parts are somewhat inverted with reference to FIGURE 2.

FIGURE 4 is a sectional view taken on line 3—3 of FIGURE 2, but showing the first lateral plunger element and the wedge in elevation.

The form of the invention shown includes an L-shaped cylindrical hollow body 10, one leg of which is connected with an operating cylinder 11 by means of a threaded adapter 12. Upper and lower set screws 13 in the wall of the adapter 12 engage the threads of the cylinder 11 and the threads of the body 10 to secure the named parts in place. A conventional rivet set 14 on the extending end of the piston extension 15 of the cylinder 11 is slidably received in a sleeve bushing 16 in the adjoining end of the body 10. In its retracted position, the end of the rivet set 14 is even with the inner end of the sleeve bushing 16. Inwardly of the sleeve bushing 16 and making contact therewith, there is a cylindrical anvil 17 slidably mounted in the body 10.

Within the outer corner of the body 10 there is a deflector 18 of solid material having a flat diagonal surface 19 which extends from the inner surface of one leg to the inner surface of the other leg. The surface of the deflector 18, other than the diagonal surface 19, is shaped to fit the adjoining inner surface walls of the body 10. The deflector 18 is secured in the corner of the body 10 by a screw 20.

A wedge 21 having an inclined surface 22 is in contact with the diagonal surface 19 of the deflector 18, and which wedge is received at its large end in the leg of the body 10 including the anvil 17. The small end of the wedge 21 extends into and crosses the axial center of the remaining leg of the body 10. Except for the diagonal surface 22, the wedge 21 is cylindrical and is of a diameter less than the inside diameter of the body leg in which the wedge's large end is received.

In opposing surfaces of the anvil 17 and wedge 21 there are aligned spherical recesses 23 and 24 which are less than hemispherical for receiving a ball bearing 25. The diameters of the recesses 23 and 24 are greater than the diameter of the ball 25, and the depths of the recesses are such that the opposing surfaces of the anvil 17 and wedge are slightly spaced in assembly.

Within the end of the remaining or lateral leg of the body 10 there is a threaded bushing 26 which slidably receives an outer plunger element 27. The plunger element extends outwardly of the bushing 26 where it has an integral rivet set 28. Around the plunger element 27 adjacent the rivet set 28 there is a groove 29 which receives the small end of a generally conical tension spring 30, the large end of which spring is mounted on threads 31 around the lateral leg of the body 10. A flanged screw 32 in the last referred to leg engages the large end of the spring 30 to hold the same in place.

The outer plunger element 27 extends inwardly of the bushing 26 where it contacts the end of an inner plunger 33. The two plunger elements 27 and 33 may be aligned by means of a dowel, not shown, received in their abutting ends, or by other such means, such as threading. On the inner end of the inner plunger element 33 there is a flat enlarged head 34 which makes contact with a notched flat surface 35 in the wedge 21. The flat surface 35 is parallel with the axis of the wedge 21 and opposite the diagonal surface 22. Around the inner end of the outer plunger element 27 and around the inner plunger element 33 there is a coiled compression spring 36, the ends of which bear against the threaded bushing 26 and the plunger head 34. A transverse slot 37 in the outer end of the threaded bushing 26 provides for adjustment of the coiled spring 36.

In operation, the last described rivet set 28 is placed against the extending rivet to be shaped and the rivet set 14 of the rivet gun is caused to reciprocate in the usual manner. As in conventional practice, a bucking bar, not shown, is held against the rivet head. Extending movement of the first rivet set 14 moves the anvil 17 and wedge 21 in the same direction. Sliding action of the inclined wedge surface 22 on the diagonal surface 19 of the deflector 18 causes the wedge 21 to move laterally with the result that the plunger elements 33, 27 and the rivet set 28 are also moved laterally. As the first rivet set 14 is retracted, the action of the springs 30 and 36 returns the movable parts to their first positions. The ball 25 spacing the wedge 21 and anvil 17 reduces friction between these parts.

The invention is not limited to the exemplary construction herein shown and described, but may be made in various ways within the scope of the appended claims.

What is claimed is:

1. An angle attachment for a rivet gun having a projecting reciprocating member, said attachment being comprised of an angular hollow cylindrical body, one leg of which is attached to said rivet gun and receives said reciprocating member, a deflector in the outer corner of said body and having a diagonal surface extending from one leg of said body to the other, a wedge in sliding contact with said diagonal surface, the large end of said wedge being received in that leg of said body including said reciprocating member and the small end of said wedge extending into the remaining said leg, said large end of said wedge having a transverse dimension less than the transverse dimension of the leg in which it is received, means contacting the large end of said wedge with said reciprocating member, a bushing within the extending leg of said body, an outer plunger element in said bushing and extending outwardly of the last said leg, a rivet set on the extending end of said plunger element, means contacting the inner end of said plunger element with said wedge, and spring means urging said outer plunger element inwardly.

2. An angle attachment for a rivet gun as defined in claim 1 and wherein said means contacting the large end of said wedge with said reciprocating member is comprised of a slidably mounted anvil therebetween, hemispherical recesses in opposing faces of said anvil and said wedge, and a ball bearing received in said recesses, the diameters of said recesses being greater than the diameter of said ball bearing, and the depths of said recesses being such that said anvil and said wedge do not contact each other in assembly.

3. An angle attachment for a rivet gun as defined in claim 1 and wherein said means contacting the inner end of said outer plunger element with said wedge is comprised of an inner plunger element therebetween and having a head on its inner end and a coiled compression spring around said inner plunger element between said head and said bushing.

References Cited

UNITED STATES PATENTS

| | | | |
|---|---|---|---|
| 2,374,019 | 4/1945 | Kahler | 72—453 |
| 2,374,400 | 4/1945 | Westervelt | 72—453 |
| 2,791,123 | 5/1957 | Thomsen | 74—110 |

CHARLES W. LANHAM, *Primary Examiner.*

G. P. CROSBY, *Assistant Examiner.*